United States Patent
Regan et al.

(10) Patent No.: US 9,225,622 B2
(45) Date of Patent: Dec. 29, 2015

(54) OAM ECHO MESSAGING TO VERIFY A SERVICE-BASED NETWORK DISTRIBUTION PATH

(75) Inventors: Joe Regan, Pleasanton, CA (US); Vach Kompella, Cupertino, CA (US); Wenao Hu, San Jose, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 251 days.

(21) Appl. No.: 12/317,631

(22) Filed: Dec. 23, 2008

(65) Prior Publication Data

US 2009/0116396 A1 May 7, 2009

Related U.S. Application Data

(63) Continuation of application No. 10/833,823, filed on Apr. 27, 2004, now Pat. No. 7,486,622.

(60) Provisional application No. 60/466,248, filed on Apr. 28, 2003.

(51) Int. Cl.
H04L 12/26 (2006.01)
H04L 29/06 (2006.01)

(52) U.S. Cl.
CPC ........ *H04L 43/0817* (2013.01); *H04L 43/0811* (2013.01); *H04L 69/22* (2013.01)

(58) Field of Classification Search
CPC . H04L 43/0811; H04L 43/0817; H04L 69/22; H04L 43/50; H04L 45/26; H04L 45/00; H04J 3/14
See application file for complete search history.

(56) References Cited

U.S. PATENT DOCUMENTS

| | | | |
|---|---|---|---|
| 5,878,129 A | 3/1999 | Figurski et al. | |
| 6,779,051 B1* | 8/2004 | Basil et al. | 710/33 |
| 6,842,463 B1* | 1/2005 | Drwiega et al. | 370/468 |
| 6,967,940 B2* | 11/2005 | Marinier et al. | 370/335 |

(Continued)

FOREIGN PATENT DOCUMENTS

| | | |
|---|---|---|
| JP | 9307932 | 11/1997 |
| JP | 2000175250 | 6/2000 |
| WO | 9827694 | 6/1998 |
| WO | 9923578 | 5/1999 |

OTHER PUBLICATIONS

Kompella et al., "Detecting MPLS Data Plane Liveness *Draft*", Internet Engineering Task Force, IETF, vol. mpls, No. 1, Oct. 1, 2002.

(Continued)

*Primary Examiner* — Alpus H Hsu
*Assistant Examiner* — Anthony Luo
(74) *Attorney, Agent, or Firm* — Van Pelt, Yi & James LLP

(57) ABSTRACT

Echo messaging for operation, administration, and management of a service-based distribution path and associated services are disclosed. Service-based distribution paths or transport tunnels include services mapped or bound to a path associated with the transport tunnel. Echo messaging provides OAM capabilities to monitor the operational state of a service-based distribution path, including determining configuration, connectivity, and other characteristics of the path and associated services that transport data. OAM functions provided by echo messaging enable OAM functions despite service volume along a core network, path or set of paths.

21 Claims, 9 Drawing Sheets

(56) References Cited

U.S. PATENT DOCUMENTS

| | | | |
|---|---|---|---|
| 2003/0227919 A1* | 12/2003 | Zelig et al. | 370/392 |
| 2004/0032876 A1* | 2/2004 | Garg et al. | 370/443 |
| 2004/0114924 A1* | 6/2004 | Holness et al. | 398/33 |
| 2004/0202159 A1* | 10/2004 | Matsubara et al. | 370/389 |
| 2005/0036447 A1* | 2/2005 | Mawhinney et al. | 370/230 |
| 2005/0088977 A1* | 4/2005 | Roch et al. | 370/254 |

OTHER PUBLICATIONS

Stokes et al., "Testing Hierarchical Virtual Private LAN Services", Internet Engineering Task Force, IETF, No. 1, Dec. 1, 2002.

Senevirathne et al., "Architecture, Model and Requirements for Operations and Maintenance (Testability) of Virtual Private Networks and Application Level VPN Testability Solution", Internet Engineering Task Force, IETF, No. 2, Oct. 1, 2002.

* cited by examiner

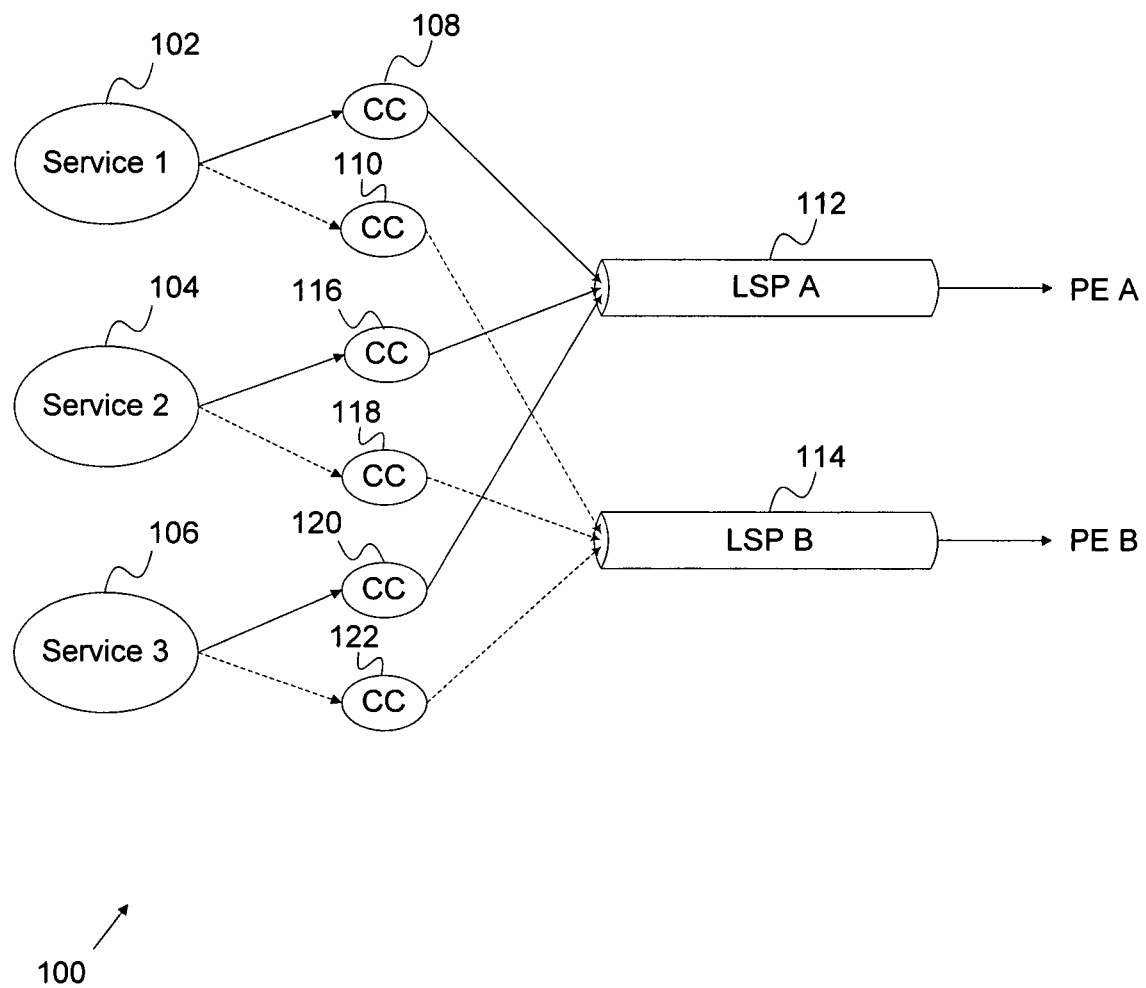
FIG. 1 - Prior Art

OAM ECHO MESSAGING TO VERIFY A SERVICE-BASED NETWORK DISTRIBUTION PATH

CROSS REFERENCE TO OTHER APPLICATIONS

This application is a continuation of U.S. patent application Ser. No. 10/833,823 entitled OAM ECHO MESSAGING TO VERIFY A SERVICE-BASED NETWORK DISTRIBUTION PATH, filed Apr. 27, 2004, now U.S. Pat. No. 7,486,622 which is incorporated herein by reference for all purposes; and claims priority to U.S. Provisional Patent Application No. 60/466,248 entitled ECHO MESSAGING TO VERIFY SERVICE-BASED NETWORK DISTRIBUTION PATH, filed Apr. 28, 2003, which is incorporated herein by reference for all purposes.

BACKGROUND OF THE INVENTION

The present invention relates generally to computer networks and networking protocols. More specifically, OAM echo messaging to verify service-based network distribution paths is disclosed.

BACKGROUND OF THE INVENTION

Transport tunnels are employed in communications, networks, and networking equipment (e.g., routers, switches, hubs, etc.) to route data between endpoints, such as between provider edge (PE) routers on the edge of a provider network. In some instances, transport tunnels may be used to forward packets through a network that does not support the particular packet protocol in use. For example, a transport tunnel may be used to forward a non-IP packet across an IP network, multicast packets across a unicast network, etc.

Services (e.g., leased lines, virtual leased lines (VLL), etc.) may be bound to a transport tunnel and often numerous services may be associated with a single transport tunnel. However, with numerous services, effective service management is also difficult to implement. This limits the ability of networks to efficiently implement and operate services across core networks, leading to significant time and expense in both managing the transport tunnels as well as the services that connect to them. Further, besides transmitting data packets, capabilities for testing, monitoring, and managing transport tunnels may be difficult where large numbers of services are involved.

Existing protocols and standards allow the configuration and connectivity of a transport tunnel, such as a label switched path (LSP), to be verified (e.g., LSP ping). However, existing tools do not address adequately the need to be able to verify service configuration and connectivity.

Thus, a solution is needed that facilitates the operation, administration, and maintenance of services used to transport data across a network.

BRIEF DESCRIPTION OF THE DRAWINGS

Various embodiments of the invention are disclosed in the following detailed description and the accompanying drawings.

FIG. 1 illustrates an exemplary system for binding services to label switched paths;

DETAILED DESCRIPTION

Figure 2A:
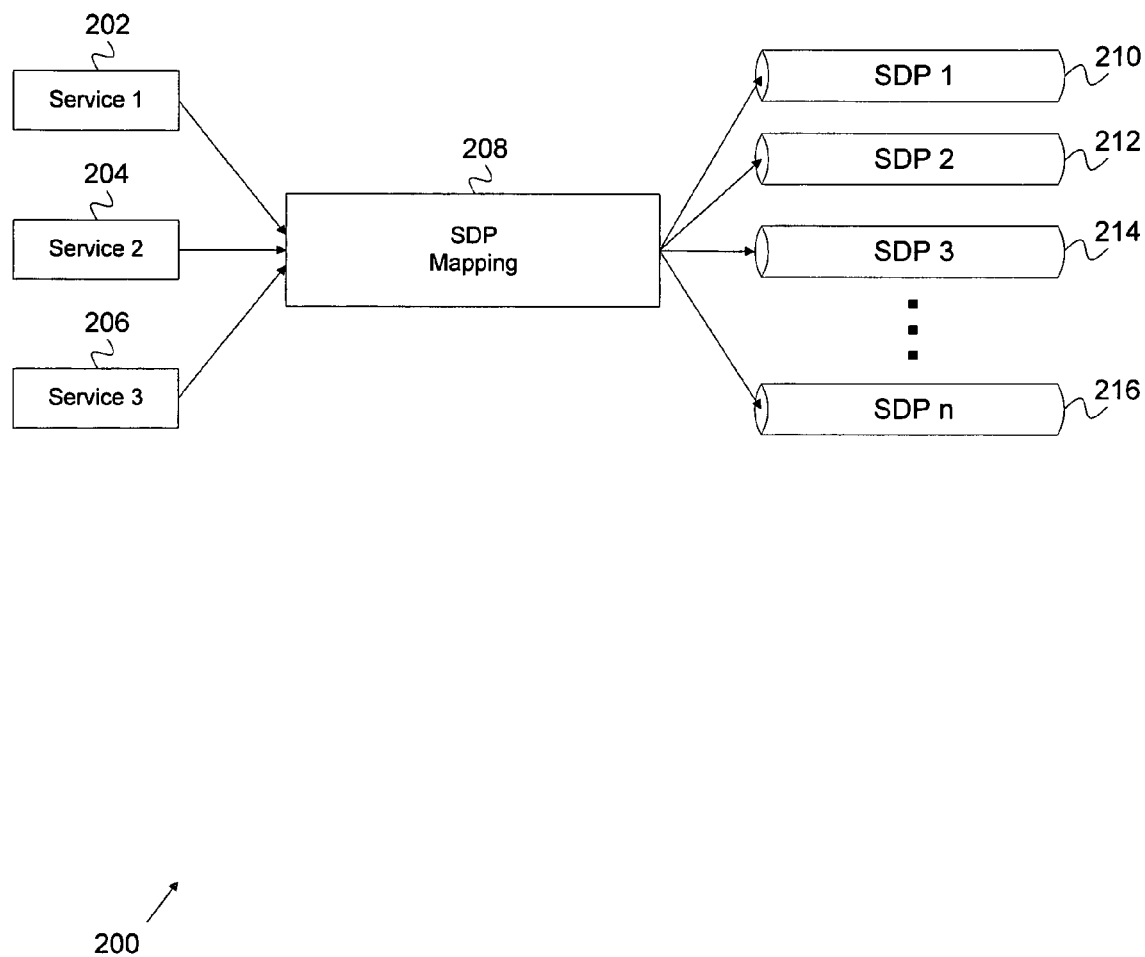
FIG. 2A illustrates an exemplary system for using transport tunnels bound to service-based distribution paths.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Internetworking and data communication across one or more networks may require multiple protocols or techniques for forwarding packets between endpoints such as internetworked edge routers. Endpoints such as provider edge routers (PEs), edge service routers (ESRs), or other label edge routers (LERs) may use a transport tunnel such as a service-based distribution path (SDP) to transport data to downstream customer edge routers (CE) and end destinations (e.g., MAC addresses). A service-based distribution path may also be a service distribution point and one or more associated transport tunnels. SDPs may be established using protocols such as multiprotocol label switching service (MPLS), MPLS-Traffic Engineering (MPLS-TE), IP, or other types of generic routing encapsulation (GRE) protocols that affect Layer 2 or 3 communications. SDPs may be implemented as transport tunnels (e.g., unidirectional, bidirectional, omnidirectional) between endpoints to provide a transport tunnel for service packet transmission. However, in addition to transport capabilities, OAM functions are also enabled in SDPs. In the case of MPLS, label-switched paths (LSPs) may be associated (as individual paths or sub-paths) with SDPs, which in turn may have a service or set of services mapped or bound to them. OAM functions are enabled using SDPs, using information generated from echo messaging, a system for OAM messaging and information/data gathering. Regardless of the core network protocol in use, an SDP enables improved service control, monitoring, configuration, and OAM capabilities.

A transport tunnel (e.g., SDP, unidirectional transport tunnel, etc.) may have one or more paths associated with it (e.g., multiple LSPs). An SDP may include unidirectional and other types of transport tunnels for forwarding data packets from multiple services. The use of LSPs, such as those used in MPLS, may be implemented as individual routes within a particular SDP which route data packets between a near-end and a far-end destination (e.g., ESR). Once a path has been associated with a transport tunnel, a service is mapped to a respective path and transport tunnel. Once mapped, verification may be made regarding the operational status of the service, SDP, path, etc. Operational service and SDP verification may determine configuration, connectivity, the end-to-end operational state of an SDP, an inoperable SDP, round trip times (RTT), payload capability, or other information about a service or SDP, or other OAM capabilities.

OAM capabilities may be implemented in an SPD using OAM messaging. An example of a type of messaging is "OAM echo messaging." In general, OAM echo messaging may be used to facilitate high level verification that a given SDP or Service-ID is operational and connected between ESRs. OAM echo message formats include SDP echo request and reply, service echo request and reply, which may include various header fields for identifying the type of task that a particular message is intended to perform.

FIG. 1 illustrates a system for binding services directly to individual label switched paths. Services 102-106 send data to provider edge (PE) router A via LSP A 112 using cross connects (CC) 108, 116, and 120, respectively. Service 102-106 send data to PE router B via LSP B 114 using cross connects 110, 118, and 122, respectively. Each service 102-106 is individually configured with an independent cross connect for each LSP. Fewer or more cross connects and services may be implemented, but where multiple services are employed, management, monitoring, and control may become increasingly complicated. For example, a change to LSP 112 would require that each of cross connects 108, 116, and 120 be reconfigured to reflect the change. In the simplified example shown in FIG. 1, only three services (and/or their associated cross connects) would have to be reconfigured. However, in a typical commercial embodiment, there may be thousands of services and dozens or more LSPs. In addition, the individuals provisioning the services 102-106 would have to know certain information about the LSPs 112 and 114 in order to be able to bind the services directly to the LSPs by correctly configuring the cross connects, which requires that the persons who configure the services have knowledge about the transport paths (LSPs) that they otherwise would not need to have, thereby potentially increasing training, recruitment, salary, and other costs.

FIG. 2A illustrates an exemplary system 200 in which transport tunnels bound to service-based distribution points (SDPs) are used to provide service-based transport of network traffic. Services 1-3, labeled 202-206, in FIG. 2A, are bound by SDP mapping module 208 to one or more of SDPs 210-216. While the SDP mapping module 208 is shown as a single box in FIG. 2A, in some embodiments it may be implemented as a set of individual cross-connects binding each service to one or more of SDPs 210-216. SDPs 210-216 may be implemented having one or more transport tunnels (e.g., LSPs) associated with each SDP. The transport tunnels may be static or dynamic. In one embodiment, each SDP comprises a distribution point for a single destination (egress) PE router. Each SDP may have multiple services bound or mapped to it by the SDP mapping module 208. In one embodiment, an ingress PE router may have more than one SDP associated with the same destination (egress) PE, but each service may be bound or mapped only to one SDP for each destination to which the service may be configured to send data. LSPs are one example of a type of transport tunnel that may be associated with an SDP for transporting service packets across an MPLS core network. With other types of core networks or networks that may use different core routing protocols, other types of paths may be used. Regardless of the core network protocol, each SDP 210-216 may be treated as a distribution point having one or more associated transport tunnels that connect a near-endpoint with a far-endpoint/destination, to which one or more services may be mapped in order to enable the service(s) to send service packets (or service data in some other form) to the destination associated with the SDP. By binding the services 202-206 to the SDPs, instead of binding the services directly to the transport tunnels (e.g., LSPs) as in FIG. 1, the services 202-206 can be configured independently of the transport tunnels, and vice versa, thereby simplifying the provisioning and/or reconfiguration of each. For example, if an LSP in SDP 1 (210) were added, removed, or changed, the information about the LSP would only have to be modified once, in the SDP. The services 202-206, which are in the system 200 bound by the SDP mapping module 208 to the SDP and not directly to the transport tunnels associated with the SDP, would not require any change. Similarly, services could be added, removed, or changed without requiring that multiple cross connects to a plurality of LSPs (or other transport paths) be modified.

In one embodiment, an SDP has several attributes for providing service-based data communication capabilities. Examples of these attributes include an address (e.g., IP address) for a far-end destination (e.g., PE or other egress equipment or node) that represents an endpoint to which network traffic associated with the service may be sent for further delivery to a customer destination associated with the service, the type of encapsulation used to transport data to the destination (e.g., GRE, MPLS, L2TP, etc.), a path used to reach a far-end destination (where applicable, e.g., MPLS), and the maximum transmission unit (MTU) for the path. An SDP provides control capabilities using these attributes that determine how service packets (i.e., packets transported to implement a specific service such as a virtual leased line (VLL) or other type of service provided by a vendor or service provider, etc.) are transported and handled on an end-to-end basis throughout the network. An SDP may be used to transport packets associated with a single service or multiple services. By grouping multiple LSPs or paths into a single transport tunnel (SDP), services packets may be load shared among the LSPs comprising the SDP. That is, packets may be distributed among several paths for routing to an end service destination, instead of sending packets for a particular service across a single path. A protocol may also be used for dynamically monitoring the end-to-end operational state of an SDP, providing the capability to determine whether the operational state of an SDP has changed and, if so, what services may be affected. As an example, a "keep alive" protocol may be implemented that provides for specific header values or information that, upon de-multiplexing, may be used for operation, administrative, and maintenance (OAM) functions.

Figure 2B:
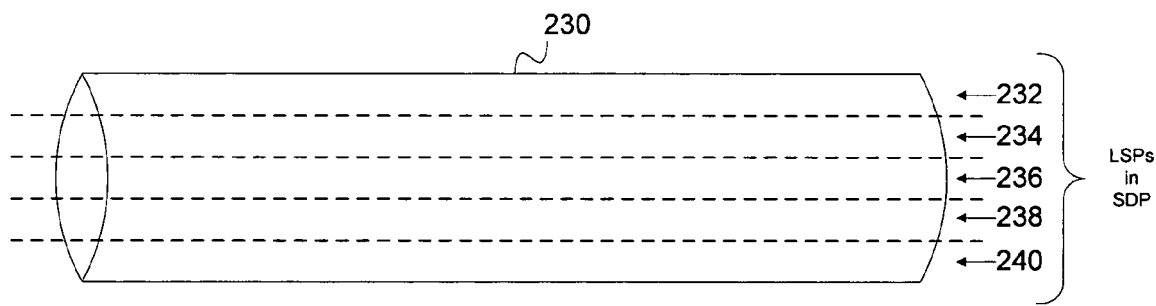
FIG. 2B illustrates an exemplary service-based distribution path including associated transport tunnels.

FIG. 2B illustrates an exemplary service-based distribution point including associated transport tunnels. SDP 230 is shown having several LSPs 232-240 (assuming MPLS is in use) associated with it. In other examples where MPLS may not be in use, transport tunnels other than LSPs may be used. For purposes of illustration where MPLS or MPLS-TE are used, LSPs 232-240 transport service packets between a near-end (ingress) router and one or more far-end (egress) routers associated with the SDP. In FIGS. 2A and 2B, SDPs are represented graphically as tunnels comprising one or more component transport tunnels, such as LSPs, to convey the concept that SDPs provide a way to transport data, via the transport tunnels associated with them, to a destination associated with the SDP. It should be understood that the SDPs do not in fact represent transport mechanisms separate from or layered on top of the transport tunnels associated with them, and instead serve as a distribution point configured to cause data packets associated with services bound to the SDP to be transported to a destination associated with the SDP via a transport tunnel (e.g., LSP) associated with the SDP. Establishment and configuration of an SDP will be described in greater detail below in connection with FIGS. 3 through 9.

Figure 3:
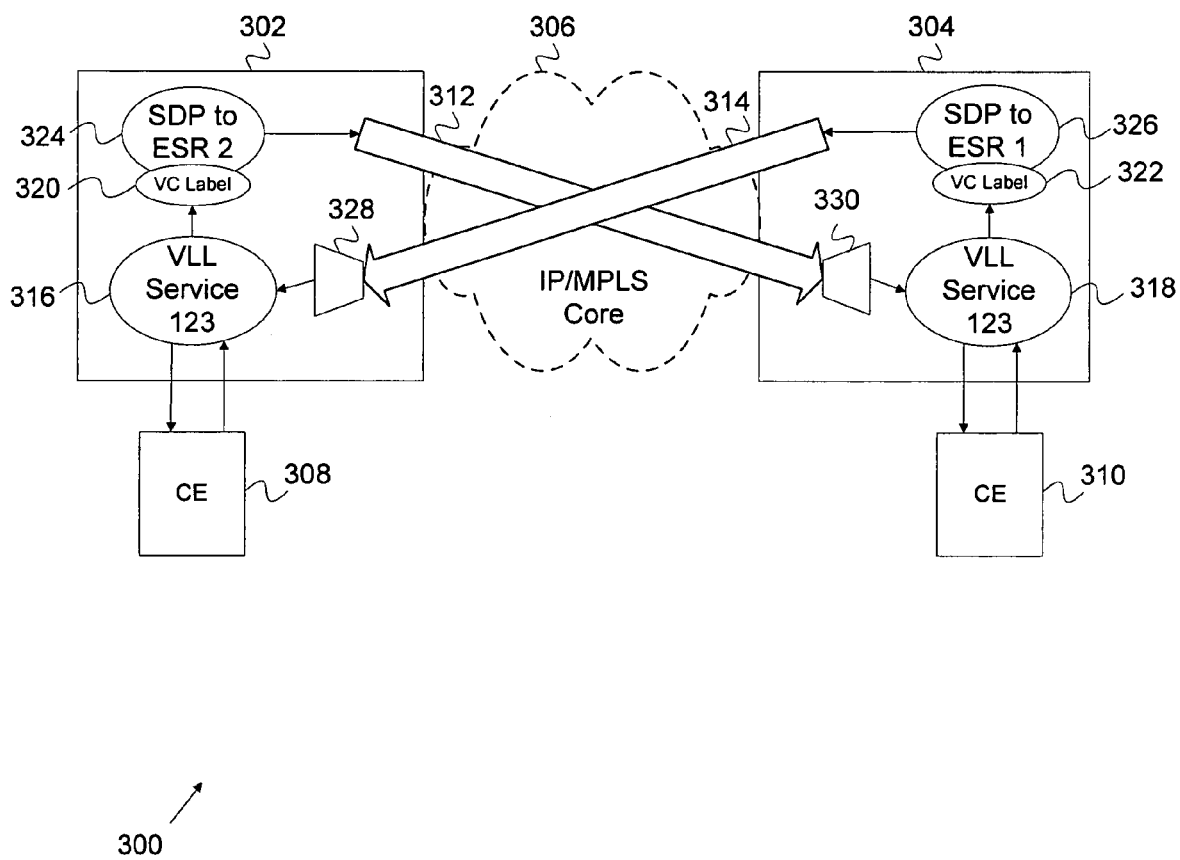
FIG. 3 illustrates an exemplary system having unidirectional transport tunnels interconnecting endpoints across a network.

FIG. 3 illustrates an exemplary system 300 having unidirectional transport tunnels interconnecting endpoints across a network. This illustration shows a more detailed example of a system where SDPs may be used to provide service-based transport of data across a network or series of networks. Edge service routers (ESRs) 302 and 304 are connected across network 306. In this example, network 306 is illustrated as being an IP/MPLS core network. In other embodiments, other types of core network may be used. CEs 308-310 send packets received from ESRs 302 and 304, respectively, to the final customer destinations to which they are addressed, such as MAC addresses within their respective customer networks. CEs 308 and 310 also received from associated customer nodes packets to be transported using VLL Service 123 and deliver such packets to ESRs 302 and 304, respectively, for transport. Unidirectional transport tunnels 312 and 314 provide the transport mechanism for service packet transmission and are associated with the SDPs illustrated in this example. In one embodiment, transport tunnel 312 comprises an LSP associated with SDP 324 and transport tunnel 314 comprises an LSP associated with SDP 326. Here, a service such as VLL may be implemented using bidirectional service access points 316-318. In other embodiments, other types of service, e.g., VPLS, may be provided. Service packets are exchanged between service access points 316-318 and transported over unidirectional transport tunnels 312 and 314. In this example, virtual circuit (VC) labels 320 and 322 are applied to the service packets originating from service access points 316 and 318, respectively. SDPs 324-326 forward the service packets with the appended VC Labels 320-322 across unidirectional transport tunnels 312 and 314 to ESRs 302-304. Upon receipt of the service packets with the prepended VC labels, de-multiplexers 328 and 330 identify the service packets as destined for service access points 316 or 318, based on VC labels 320-322, and route them accordingly.

In the example shown in FIG. 3, a customer packet associated with VLL Service 123 that is sent by a source associated with CE 308 to a destination associated with CE 310, for example, would be sent by CE 308 to ESR 302. ESR 302 would receive the packet and associate the packet with VLL Service 123 (e.g., based on the port on which it was received, encapsulation used, a label or other identifying information included in the packet, etc.). The service access point 316 forwards the packet to SDP 324 (either directly in the embodiment shown or via an SDP mapping module, not shown in FIG. 3 but described above in connection with FIG. 2A, e.g., in an embodiment in which multiple services may use the same SDP) for transport to egress ESR 304. The SDP 324 encapsulates the packet for transport to ESR 304 via unidirectional transport tunnel 312, including by appending a VC label 320 that identifies the packet as being associated with Service 123. In an embodiment in which SDP 324 comprises two or more transport tunnels to ESR 304, SDP 324 selects a tunnel to be used to transport the packet to ESR 304. For example, in an embodiment in which the SDP 324 comprises two or more LSPs, the SDP 324 may be configured to bind a service to a particular LSP, e.g., a VLL service such as VLL Service 123, so that all traffic for the service is sent via the same LSP. For other types of service (e.g., VPLS or VPRN), the SDP may map packets to an LSP for transport by associating the packet with a "conversation" (i.e., a related set of packets being exchanged between two endpoints) and select an LSP associated with that conversation (e.g., to prevent packets from being delivered out of order, as might happen if different packets associated with a conversation were sent via different paths.) In some embodiments in which VPLS, VPRN, or similar service is being provided, the destination MAC address may be used to identify the LSP to be used to transport the packet. When the packet arrives at ESR 304, demultiplexer 330 identifies the packet as being as associated with Service 123, e.g., based on the presence of VC label 320, and delivers the original (payload) packet to service access point 318 for processing. Service access point 318 then delivers the packet to CE 310.

Figure 4:
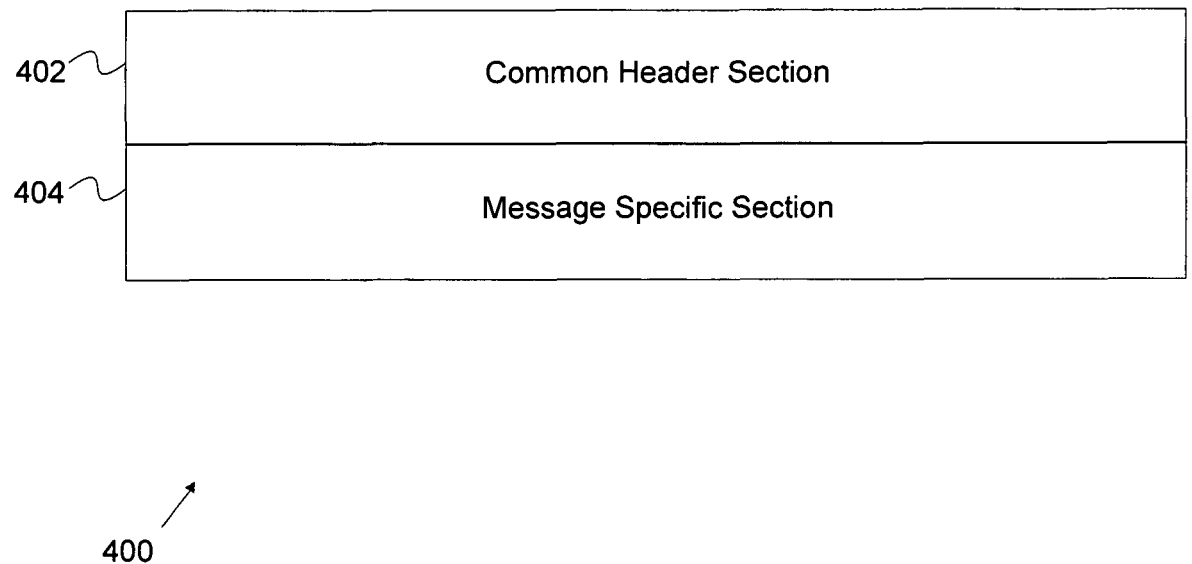
FIG. 4 illustrates an exemplary OAM message format.

FIG. 4 illustrates an exemplary OAM message format. In this embodiment, an OAM message 400 may include two sections, a common header section 402 and a message specific section 404. The common header section 402 includes fields that may be filled by an originator or a responder of an echo message. Examples of fields that may be included in common header section 402 includes fields for identifying the version of OAM messaging being used, the message type, the message length, a message identifier, the identity of the originator, the identity of the responder, an identifier for the SDP used by the originator, an identifier for the SDP used by the responder and/or associated by the responder with the service, and an optional checksum. Other fields may be used in this or other embodiments and are not limited to the examples above.

In one embodiment, the OAM messaging version field defines the version of OAM messaging being used. This field determines whether the endpoints of a particular service or SDP are using the same or correct version of OAM messaging. If different, then the echo message is discarded.

In one embodiment, the message length field identifies the total length of the message comprising common header section 402 and message specific section 404. The message type field identifies the OAM message by type. In one embodiment, the following types are defined: SDP echo request (sent by a near end or ingress SDP to a far end destination, e.g., to verify SDP configuration and/or connectivity); SDP echo reply (to reply to an SDP echo request); service echo request (sent from a near end or ingress ESR, e.g., to verify service configuration on the near and/or far ends); and service echo reply (to reply to a service echo request). In this example, messages other than the types described above are discarded. However, in other embodiments, different types of messages may be used. The message identifier is a unique identifier (e.g., sequence number) assigned by the message originator. Exemplary rules for assigning a message identifier are described in U.S. Provisional Patent Application No. 60/466, 340, filed Apr. 28, 2003.

The originator identifier included in the originator identifier field of common header section 402 may be used to authenticate a received reply message. As an example, the responder to an echo request message does not alter the originator field, but populates an echo reply message that includes in the common header the originator identifier of the request message. The responder may use the originator identifier to determine the source of the echo message request, as tunnel/SDP information may not be usable for this purpose. When a reply is to be sent via an SDP to the originator of the request, a receiver of an echo request may use the originator identifier field to find a suitable SDP to use as a reply path. If the reply message is generically encapsulated in IP/GRE, as opposed to sent via an SDP, as described below in connection with FIG. 5, the originator identifier may be used to determine a destination IP address for the originator.

The responder identifier field of the common header 402 is a bit field populated in one embodiment by an echo request message originator and checked by an echo request message receiver. In one embodiment, the IP address of the responder is used as the responder identifier. In such an embodiment, if the IP address in the responder identifier field is not the same as the service IP address of the receiving, far-end ESR, then the responder identifier field in an echo reply message sent by the receiving ESR in response to the echo request message is changed to the correct IP address.

The format of the message specific section 404 depends on the type of message being sent. In one embodiment, if the OAM, message 400 is an SDP echo request message or an SDP echo reply message, the message specific section 404 comprises a set of SDP echo originator flags used by the originator of the echo request (or the originator of the request to which to which the reply is responding, in the case of an echo reply) to provide information about the request message and the configuration of the SDP on the originator's end, and a set of SDP echo responder flags used by the receiver of the request message to provide in the receiver's reply message information about the receiver's SDP echo reply message and the configuration of the SDP that the receiver has associated with the originator. Examples of SDP echo originator flags used in one embodiment include flags for indicating whether various fields of the common header 402 contain valid values, flags to inform the request receiver of the operational and/or administrative state of the originator SDP identified in the common header, a flag indicating whether the request was sent using the originator SDP identified in the common header (or whether instead generic IP/GRE encapsulation was used, e.g.), flags to indicate the operational and/or administrative state of the originator equipment associated with the originator identifier included in the header, and a flag telling the request receiver whether the receiver should reply to the request via the responder SDP identified in the header. Examples of SDP echo responder flags used in one embodiment include flags used to inform the originator of the validity or invalidity of header values included by the originator in the request, flags to inform the request originator of the operational and/or administrative state of the responder SDP identified in the common header, a flag indicating whether the request was sent using the responder SDP identified in the common header (or whether instead generic IP/GRE encapsulation was used, e.g.), flags to indicate the operational and/or administrative state of the responder equipment associated with the responder identifier included in the header, and a flag telling the request originator that the responder identifier included in the request was incorrect or has been changed and that the new responder identifier included in the reply should now be used. Other originator and/or responder flags and/or fields may be used similarly to those described above to verify the configuration and connectivity of outbound and/or return SDPs.

In the case of an OAM service echo request message or an OAM service echo reply message, in one embodiment the message specific section 404 may comprise fields for providing and/or verifying information relating to the service being verified and/or one or more flags used to signal information regarding a service echo request or reply message and/or the service to which it relates. For example, the message specific section 404 may comprise fields for providing a service identifier associated with the service, an identifier for the respective virtual circuit labels associated with the service by the originator and the responder, respectively, as well as a set of service echo originator flags and a set of service echo responder flags. The service echo originator flags may be used to signal such information as whether certain header fields (e.g., originator SDP identifier or originator identifier) contain valid data, the operational and/or administrative state of the originator SDP identified in the header, whether the originator SDP identified in the header was used to send the request, whether the receiver should respond (if possible) using the responder SDP identified in the header, whether the originator service identifier included in the corresponding field of the message specific section 404 is valid and whether the associated service is operationally and/or administratively up or down on the originator's end, and whether the service is bound to the originator SDP identified in the header. The service echo responder flags may be used to provide corresponding information regarding the configuration and state of the service on the responder's end and the validity of data in the common header 402 and/or message specific section 404. Additional sets of flags may be included to provide information about the validity and operational state of ingress and egress VC labels associated with the service at each end, as well as information regarding how the VC labels were signaled or provisioned.

Figure 5A:
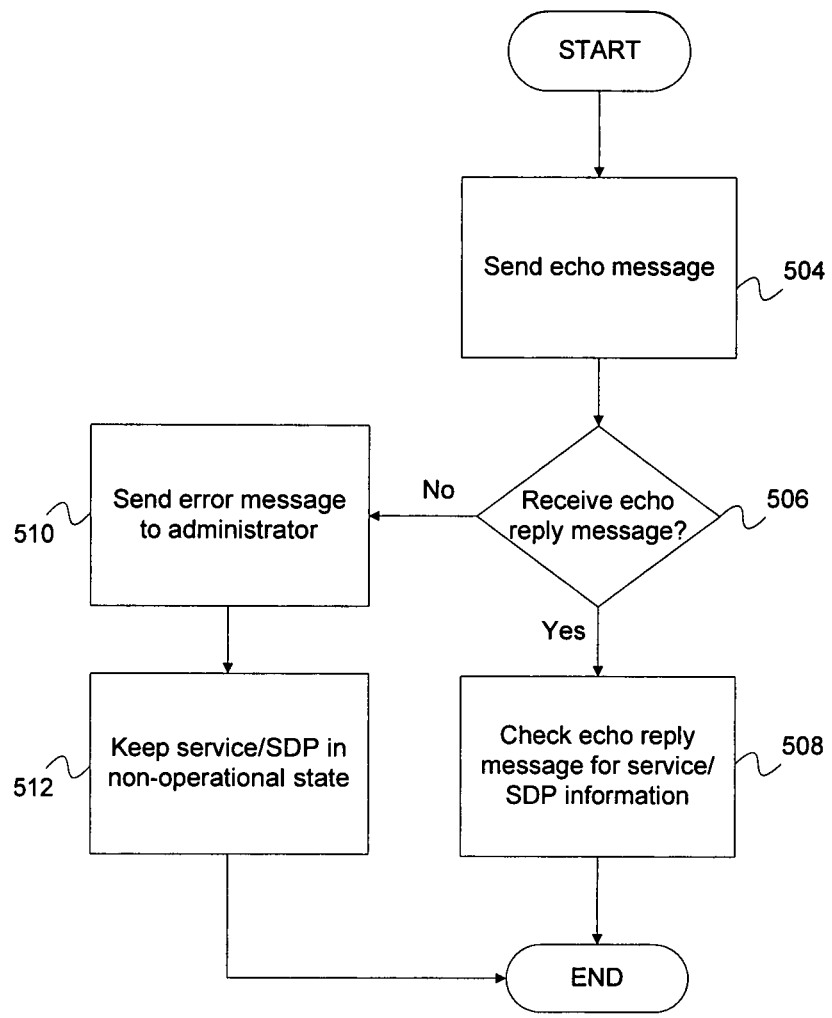
FIG. 5A illustrates a process for operational service determination, in accordance with an embodiment.

FIG. 5A illustrates a process for operational service or SDP determination, in accordance with an embodiment. An operational service or SDP determination is a general example of an OAM function that may be performed. In this embodiment, echo messaging for OAM purposes, as described above, may be used to implement operational service determination. An echo request message is sent to the far-end ESR to determine service or SDP availability and/or configuration, operational state, connectivity, and other information (e.g., MTU, payload, etc.) (504). A determination is made as to whether an echo reply message is received (506). If an echo reply message is received, then the message is checked for information about the configuration of the far-end ESR, Service ID, etc. (508). If an echo reply message is not received, then an error message is sent to an administrator (510) and the service or SDP is kept in a non-operational state (512). The above description may be used to describe the use of echo messaging for service or SDP determinations and, in other embodiments, may be used for other purposes.

Figure 5B:
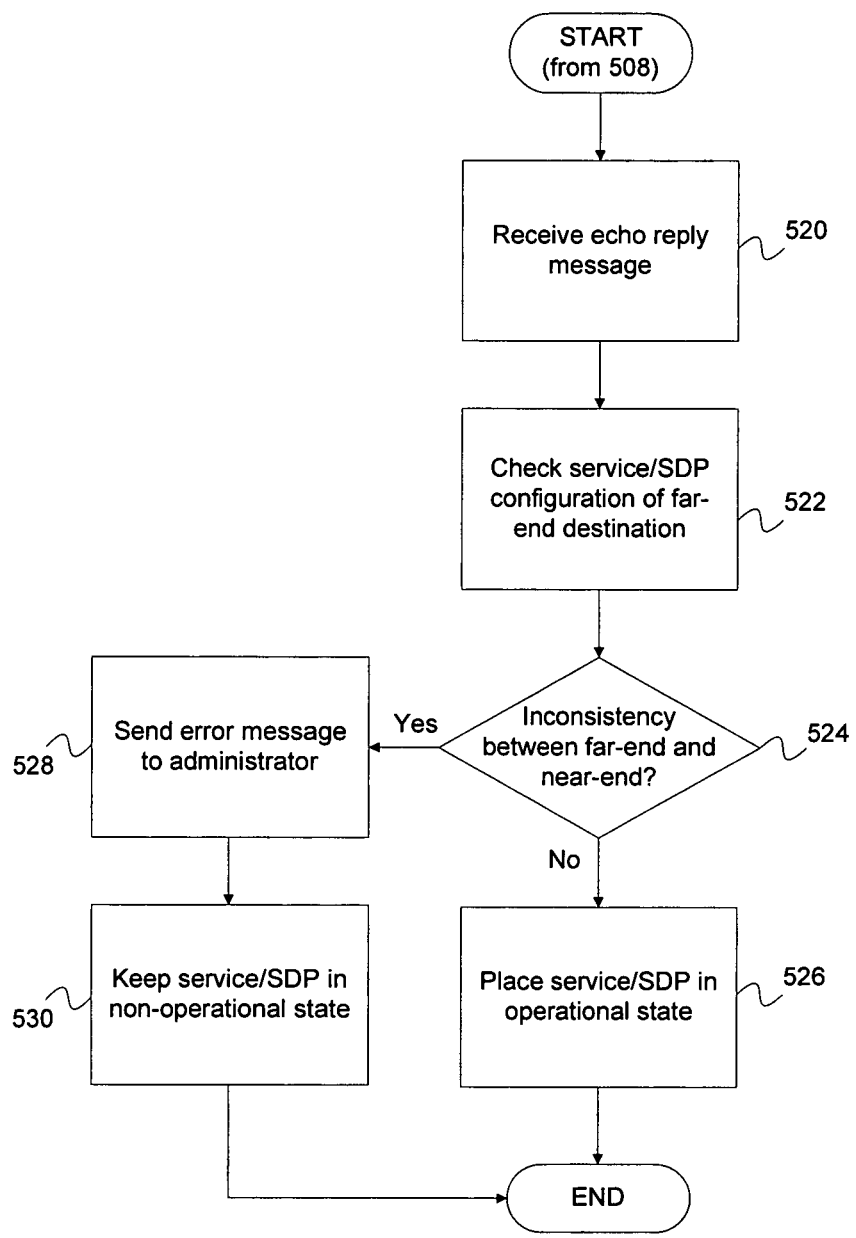
FIG. 5B illustrates a further process for checking an echo reply message, in accordance with an embodiment.

FIG. 5B illustrates a further process for checking an echo reply message, in accordance with an embodiment. In this example, an echo reply message is received (520). Upon receipt, the echo reply message is checked to determine information about a service or SDP with a far-end destination (e.g., ESR) (522). Once checked, the echo reply message yields information from which it can be determined whether an inconsistency between the far-end ESR and near-end ESR exists (524).

If an inconsistency between a far-end ESR service or SDP and a near-end ESR service or SDP is not found, then the service or SDP is placed into an operational state (526). If an inconsistency between the far-end ESR service configuration and the near-end ESR service or SDP is found, based on information included in the echo reply message, an error message is sent to the network/system administrator (528) and the service or SDP is kept in a non-operational state (530).

Figure 6:
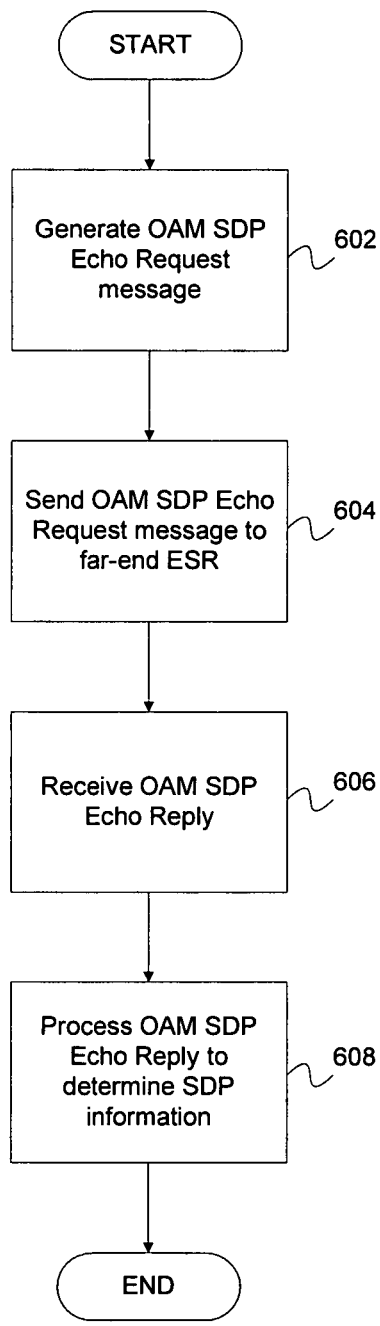
FIG. 6 illustrates a process for OAM echo message for verifying a service-based distribution path, in accordance with an embodiment.

FIG. 6 illustrates a process for OAM echo message for verifying a service distribution point, in accordance with an embodiment. In one embodiment, the process of FIG. 6 is an SDP-specific implementation of all or part of the more generic process shown in FIGS. 5A and 5B. Here, OAM SDP echo messages are sent and received between a near-endpoint (e.g., originator) and a far-endpoint (e.g., responder). OAM SDP echo messages may include an OAM SDP Echo request message and an OAM SDP echo reply message.

In this example, an OAM SDP echo request message is generated (602). During generation, the OAM SDP echo request message may have various bit fields, header values, VC labels, and other control words applied to identify specific OAM functions or information requests (e.g., SDP connectivity, SDP RTT testing, SDP-ID testing, SDP operational messaging, etc.). Once generated, the OAM SDP echo request message is sent to a far-endpoint (e.g., ESR) (604). At the far-endpoint, the OAM SDP echo request message is received (606). Once received, the OAM SDP echo request message is processed according to information included in the message format (608). In this example, processing may be performed to determine and perform the requested OAM functions or to generate and send an OAM SDP echo reply message from the responder back to the originator that generated the OAM SDP echo request message.

Figure 7:
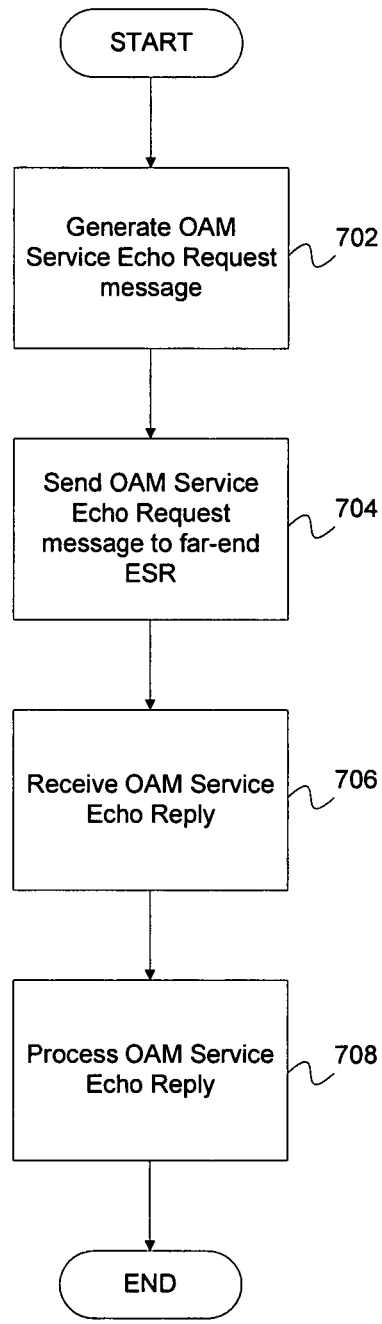
FIG. 7 illustrates a process for OAM echo messaging for verifying a service on service-based distribution path, in accordance with an embodiment.

FIG. 7 illustrates a process for OAM echo messaging for verifying a service mapped to a service distribution point, in accordance with an embodiment. In this example, an OAM service echo request message is generated by an originator (702). After generating the OAM service echo request message, it is sent to a responder or far-end service destination (e.g., ESR) (704). At the far-end service destination, the OAM service echo request message is received and processed. For example, the receiver may verify "responder" data included in the request and may gather and/or verify information regarding the configuration of the service at the responder's end. OAM service echo reply message is generated by the responder and sent back to the originator. The OAM service echo reply is received (706). Once received, the OAM service echo reply message is processed to determine whether the service is configured correctly (708). OAM service echo messages may be used to determine information related to various characteristics of a service including whether the service exists on the far end and, if so, the operational and/or administrative status of the service at the far end, service connectivity through a local SDP (i.e., can the local ESR send service packets successfully to the far end), service connectivity through a remote SDP (i.e., can the far end ESR send service related packets back to the originator), and whether the respective VC labels associated by the originator and responder with the service are bound to the correct customer/service. In other examples, OAM functions beyond those described above may also be used with OAM service echo messaging, such as verifying a change in how the service is provisioned has been implemented and propagated properly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for verifying a service-based distribution path comprising a service distribution point and a transport tunnel associated with the service distribution point, the method comprising:

mapping one or more services to a service distribution point, to transport data associated with the mapped services via a service-based distribution path to a far-end destination connected to the service distribution point, the service-based distribution path including the service distribution point that groups together a plurality of component transport tunnels, wherein at least one of the one or more services mapped to the service distribution point is assigned to utilize at a first instance a first dynamically selected group of a plurality of component transport tunnels of the plurality of component transport tunnels of the service distribution point and the at least one of the one or more services mapped to the service distribution point is assigned to utilize at a second instance a second dynamically selected group of a plurality of component transport tunnels of the plurality of component transport tunnels of the service distribution point;

generating a request for information associated with the service-based distribution path, wherein the request for information associated with the service-based distribution path includes an OAM (Operations, Administration, and Maintenance) echo request message and the request for information associated with the service-based distribution path includes a configuration of a sender of the request;

prior to verifying a transport tunnel connectivity with the far-end destination, sending the request to the far-end destination via the service-based distribution path;

receiving one reply to the request, where the reply is generated based at least in part on the passage of the request to the far-end destination via the service-based distribution path, wherein receiving the reply to the request includes receiving an OAM (Operations, Administration, and Maintenance) echo reply message having a sending address of the far-end destination; and processing the one reply received in response to the request sent prior to verifying the transport tunnel connectivity with the far-end destination, to determine both a connection status to and a configuration of the far-end destination, where the connection status and the configuration are determined based on the single one reply to request for information;

wherein the request is sent via the service-based distribution path and the transport tunnel.

2. A method as recited in claim 1 wherein the reply includes the requested information associated with the path.

3. A method as recited in claim 1 wherein the information associated with the path comprises one or more of the following: information about the path; connectivity information about the path; and information indicating whether the request reached the far end destination associated with the service distribution point.

4. A method as recited in claim 1 wherein the information associated with the path comprises one or more of the following: information about a service associated with the path; information about the existence of a service associated with the path; identification information associated with a service associated with the path; label associated with a service associated with the path; information about an operational state of a service associated with the path; information about an administrative state of a service associated with the path; and information about the configuration of a service associated with the path.

5. A method as recited in claim 1 wherein the requested information associated with the path comprises a first set of information associated with the path and the request includes a second set of information associated with the path.

6. A method as recited in claim 1 wherein the requested information associated with the path comprises a first set of information associated with the path and the request includes a second set of information about a service associated with the path.

7. A method as recited in claim 1 wherein the requested information associated with the path comprises a first set of information associated with the path and the request includes a second set of information associated with the path, said request is generated by a near end node associated with the service distribution point, and said second set of information comprises information about one or both of how a service associated with the path is configured at said near end node and a state at said near end node of a service associated with the path.

8. A method as recited in claim 1 wherein the service-based distribution path comprises a first service-based distribution path, the request is generated and sent by a near-end node associated with the first service-based distribution path, and the reply is received via a second service-based distribution path from the far-end destination to the near-end node.

9. A method as recited in claim 1 wherein the request is generated and sent by a near-end node associated with the service distribution point and processing said information associated with the path comprises determining whether the information included in the reply is consistent with how the path is configured at the near-end node.

10. A method as recited in claim 1 wherein the request is generated and sent by a near-end node associated with the service distribution point and processing said information associated with the path comprises determining whether the information included in the reply is consistent with how a service is configured at the near-end node.

11. A system for a service-based distribution path comprising a service distribution point and a transport tunnel associated with the service distribution point, comprising:
a processor configured to
generate a request for information associated with a service-based distribution path comprising a service distribution point that groups together a plurality of component transport tunnels associated with the service distribution point, wherein the service distribution point is configured to have one or more services associated with it and to use one or more of the component transport tunnels to transport data associated with the one or more services to a far-end destination associated with the service distribution point and at least one of the one or more services associated with the service distribution point is assigned to utilize at a first instance a first dynamically selected group of a plurality of component transport tunnels of the plurality of component transport tunnels of the service distribution point and the at least one of the one or more services mapped to the service distribution point is assigned to utilize at a second instance a second dynamically selected group of a plurality of component transport tunnels of the plurality of component transport tunnels of the service distribution point, wherein the request for information associated with the service-based distribution path includes an OAM (Operations, Administration, and Maintenance) echo request message and the request for information associated with the service-based distribution path includes a configuration of a sender of the request,
prior to verifying a transport tunnel connectivity with the far-end destination, send the request to the far-end destination associated with the service distribution point,
receive one reply to the request, wherein receiving the reply to the request includes receiving an (Operations, Administration, and Maintenance) OAM echo reply message having a sending address of the far-end destination, and
process the one reply received in response to the request sent prior to verifying the transport tunnel connectivity with the far-end destination, to determine both a connection status to and a configuration of the far-end destination; and
a network interface configured to send said request through the service-based distribution path to said far-end destination via a network and receive said reply from said network;
wherein the one reply is generated based at least in part on the passage of the request through the service-based distribution path in an attempt to reach the far-end destination, where the connection status and the configuration are determined based on the single one reply to request for information; and wherein the request is sent via the service-based distribution path and the transport tunnel.

12. A system as recited in claim 11, wherein the service-based distribution path comprises a first service-based distribution path, the request is generated and sent by a near-end node associated with the first service-based distribution path, and the reply is received via a second service-based distribution path from the far-end destination to the near-end node.

13. A system as recited in claim 11, wherein the information associated with the path comprises one or more of the following: information about the path; connectivity information about the path; and information indicating whether the request reached the far end destination associated with the service distribution point.

14. A system as recited in claim 11, wherein the information associated with the path comprises one or more of the following: information about a service associated with the path; information about the existence of a service associated with the path; identification information associated with a service associated with the path; label associated with a service associated with the path; information about an operational state of a service associated with the path; information about an administrative state of a service associated with the path; and information about the configuration of a service associated with the path.

15. A system as recited in claim 11, wherein the requested information associated with the path comprises a first set of information associated with the path and the request includes a second set of information associated with the path.

16. A system as recited in claim 11, wherein the requested information associated with the path comprises a first set of information associated with the path and the request includes a second set of information associated with the path, said request is generated by a near end node associated with the service distribution point, and said second set of information comprises information about one or both of how a service associated with the path is configured at said near end node and a state at said near end node of a service associated with the path.

17. A system as recited in claim 11, wherein the request is generated and sent by a near-end node associated with the service distribution point and processing said information associated with the path comprises determining whether the information included in the reply is consistent with how a service is configured at the near-end node.

18. A non-transitory computer program readable storage medium encoded with computer instructions for:
- mapping one or more services to a service distribution point, to transport data associated with the mapped services via a service-based distribution path to a far-end destination connected to the service distribution point, the service-based distribution path including the service distribution point that groups together a plurality of component transport tunnels, wherein at least one of the one or more services mapped to the service distribution point is assigned to utilize at a first instance a first dynamically selected group of a plurality of component transport tunnels of the plurality of component transport tunnels of the service distribution point and the at least one of the one or more services mapped to the service distribution point is assigned to utilize at a second instance a second dynamically selected group of a plurality of component transport tunnels of the plurality of component transport tunnels of the service distribution point;
- generating a request for information associated with the service-based distribution path, wherein the request for information associated with the service-based distribution path includes an OAM (Operations, Administration, and Maintenance) echo request message and the request for information associated with the service-based distribution path includes a configuration of a sender of the request;
- prior to verifying a transport tunnel connectivity with the far-end destination, sending the request to the far-end destination via the service-based distribution path;
- receiving one reply to the request, where the reply is generated based at least in part on the passage of the request through the service-based distribution path in the attempt to reach the far-end destination, wherein receiving the reply to the request includes receiving an (Operations, Administration, and Maintenance) OAM echo reply message having a sending address of the far-end destination; and
- processing the one reply received response to the request sent prior to verifying the transport tunnel connectivity with the far-end destination, to determine both a connection status to and a configuration of the far-end destination, where the connection status and the configuration are determined based on the single one reply to request for information;
- wherein the request is sent via the service-based distribution path and the transport tunnel.

19. A computer program readable storage medium as recited in claim 18, wherein the service-based distribution path comprises a first service-based distribution path, the request is generated and sent by a near-end node associated with the first service-based distribution path, and the reply is received via a second service-based distribution path from the far-end destination to the near-end node.

20. A computer program readable storage medium in claim 18, wherein the information associated with the path comprises one or more of the following: information about the path; connectivity information about the path; and information indicating whether the request reached the far end destination associated with the service distribution point.

21. A computer program readable storage medium in claim 18, wherein the information associated with the path comprises one or more of the following: information about a service associated with the path; information about the existence of a service associated with the path; identification information associated with a service associated with the path; label associated with a service associated with the path; information about an operational state of a service associated with the path; information about an administrative state of a service associated with the path; and information about the configuration of a service associated with the path.

* * * * *